US005392758A

United States Patent [19]

Rognon

[11] Patent Number: 5,392,758

[45] Date of Patent: Feb. 28, 1995

[54] BRACING DEVICE FOR THE BLADES OF A SAW MILL, SAW MILL USING A DEVICE OF THIS TYPE

[75] Inventor: Maurice Rognon, Morteau, France

[73] Assignee: Comadur S.A., Le Locle, France

[21] Appl. No.: 19,306

[22] Filed: Feb. 18, 1993

[30] Foreign Application Priority Data

Mar. 3, 1992 [FR] France ................................ 92 02686

[51] Int. Cl.[6] ................................ B28D 1/04

[52] U.S. Cl. ................................ 125/13.01; 83/821; 83/664; 83/676; 411/546

[58] Field of Search ................................ 125/13.01, 15; 51/206 P, 207, 168, 169, 181 R; 83/821, 664, 676; 411/546, 908, 907

[56] References Cited

U.S. PATENT DOCUMENTS 902,747 11/1908 Ligon ................................ 411/546
2,807,256 9/1957 Woolley ................................ 125/13.01
3,376,673 4/1968 Metzger et al. ................................ 51/168
3,779,607 12/1973 Staab ................................ 51/207
3,803,963 4/1974 Hunt ................................ 83/676
3,951,619 4/1976 Frangipane ................................ 51/206 P
5,000,640 3/1991 Haas, Jr. ................................ 411/907

FOREIGN PATENT DOCUMENTS 0363929 9/1962 Switzerland ................................ 125/13.01

*Primary Examiner*—Robert A. Rose
*Attorney, Agent, or Firm*—Sughrue, Mion, Zinn, Macpeak & Seas

[57] ABSTRACT

The invention relates to a bracing device (4) for the blades of a saw mill (0) having at least two saws solid with a drive shaft (22), said device being characterized in that it comprises a ring (38) from the periphery of which a plurality of tongues (40) extend having an inherent transverse resilience, said ring (38) being adapted to be disposed between said saw blades.

17 Claims, 6 Drawing Sheets

2
40
40
34
36
24
A
22
30
4
38
20

BRACING DEVICE FOR THE BLADES OF A SAW MILL, SAW MILL USING A DEVICE OF THIS TYPE

FIELD OF THE INVENTION

The invention relates to a bracing device for the blades of a saw mill as well as a saw mill using a device of this type, said device and said saw mill being more particularly designed to simultaneously saw a plurality of discs from cylinders of hard material.

DESCRIPTION OF THE PRIOR ART

Known sawing machines which are more particularly adapted to saw discs for the manufacture of watch glasses or the like generally comprise a saw mill composed of a plurality of circular saws arranged side by side on the same motor shaft mounted and driven in rotation on a frame element of the machine. The circular saws are separated from one another by means of braces which define the thickness of the discs to be sawed. These braces are generally composed of rings with saws bearing against their lateral faces. These rings have a relatively small diameter in relation to the diameter of the saws. The difference between the radius of the saws and that of the rings determines the maximum sawing depth of the saw mill in such a way that this difference must be selected so as to be as large as possible while maintaining a brace diameter that is sufficient to supply the lateral support surfaces needed to retain the saws correctly on the shaft, that is so that the saws are held in parallel to each other.

These bracing devices and consequently these saw mills are nevertheless not entirely satisfactory, particularly when used to cut items of hard materials. In fact these saw mills are generally used on sawing machines comprising a work piece slide driven by an alternative translation movement so that the saw mill is displaced by a stepwise forwards movement in a direction perpendicular to the displacement of the slide and at a rhythm of one step after each passage of the slide.

It has been observed that the saws warp as soon as the saw mill first comes into contact with the items to be cut which, after a large number of passages causes substantial loss in parallelism of the cut, this loss in parallelism becoming accentuated as sawing progresses.

This deformation during sawing is due on the one hand to the flexibility of the blades which are generally of small thickness and, on the other hand, to the irregularity and hardness of the parts to be cut, which are often in the raw state.

The use of a saw mill of this type therefore results in substantial discrepancies in the thickness of the cut parts obtained, the incidence of these discrepancies being directly proportional to the number of saws in the saw mill. It is therefore necessary to provide for the almost systematic treatment of the items cut during the semifinishing stages to eliminate discrepancies in thickness and ensure these cut pieces have an acceptable uniform thickness before any subsequent machining and finishing operations.

As a result, the use of a saw mill of this type involves high overall manufacturing costs of the cut parts, it being desirable to reduce this cost, notably when the saw mill is used to cut discs from sapphire cylinders for the manufacture of watch glasses, the cost of these sapphire cylinders accounting for almost 40% of the total cost of the finished glass.

OBJECTS OF THE INVENTION

It is therefore a main object of the invention to overcome the disadvantages of the above-mentioned prior art by providing a bracing device for the saw blades of a saw mill as well as a saw mill provided with a device of this type which permit the accurate sawing of a plurality of slices simultaneously from parts of hard material, such as sapphire cylinders, in such a way that these slices require a minimum of treatment operations before reaching their finished state.

BRIEF SUMMARY OF THE INVENTION

The object of the invention is therefore to provide a bracing device for the blades of a saw mill having at least two saws solid with a drive shaft comprising a ring with a plurality of tongues of inherent transverse resilience extending therefrom, said ring being adapted to be disposed between said saw blades.

It will thus easily be understood that once the bracing devices of the invention are mounted on a saw mill the tongues which extend from the ring between the opposing faces of the neighbouring saws prevent the saws bending during sawing whilst deforming progressively when they come into contact with the parts to be cut and resuming their initial shape thereafter as a result of their inherent resilience so that sawing is not impaired in any way. As a result, the tongues maintain the distance between the saws constant throughout the sawing process and the discrepancy in the thickness of the cut parts is greatly reduced or eliminated.

In a first embodiment of the invention the tongues extend radially from the periphery of the ring.

In a second embodiment of the invention the tongues extend substantially tangentially from the periphery of the ring.

According to an advantageous feature of the invention, the tongues are evenly distributed around the ring.

This feature prevents any imbalance which could have a undesirable debalancing effect on the dynamic equilibrium of the saw mill.

It is also an object of the invention to provide a saw mill comprising at least two saws arranged on a drive shaft and rendered solid with this latter by locking means, wherein the saws are separated from one another by a bracing device comprising a ring from which a plurality of tongues having an inherent transverse resilience extend, said ring being solid with said shaft by means of said locking means.

BRIEF DESCRIPTION OF THE DRAWINGS

Other features and advantages of the invention will emerge from study of the following description of embodiments of the invention given as a non-limiting example in association with the appended drawings in which.

DETAILED DESCRIPTION OF THE INVENTION

The following detailed description of the invention will be made with reference to a saw mill designed to saw sapphire cylinders in order to obtain discs to form watch glasses.

The invention is naturally not limited to an application of this kind and to the embodiment to be described. The invention may for example be used with any other saw mill designed to cut parts of determined thickness and the bracing device of the invention would be particularly suitable when saws are used having low bending resistance.

Figure 1:
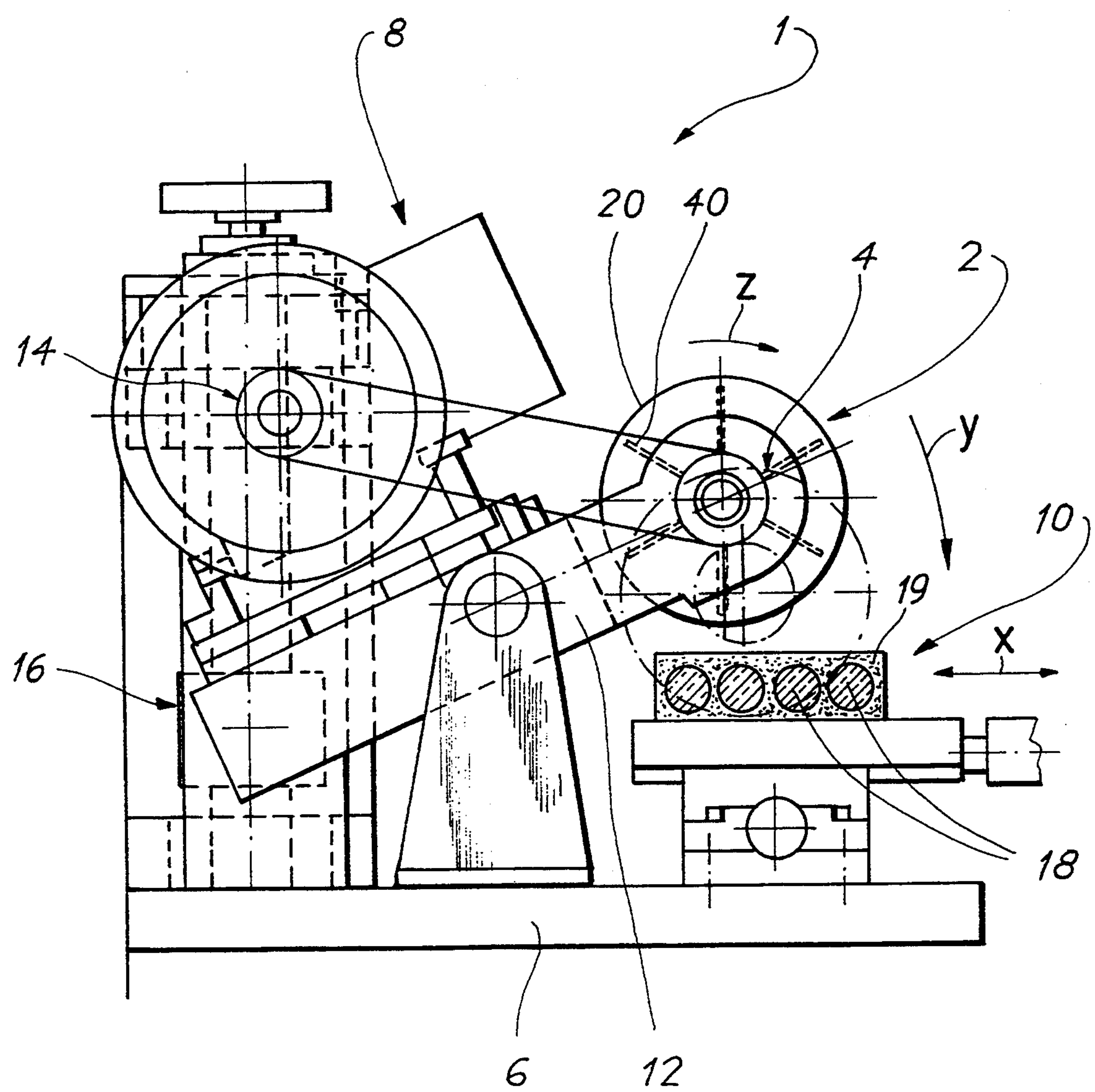
FIG. 1 shows a saw mill equipped with the bracing devices of the invention and mounted on a conventional sawing machine.

Referring first to FIG. 1, this shows a diagrammatic representation of a sawing machine given the general reference numeral 1 provided with a circular saw mill 2 of the invention. A saw mill of this type is understood to be a saw mill provided with a plurality of bracing devices 4 according to the invention which will be described in more detail hereinbelow, only one of which is shown in a dotted line in FIG. 1.

The machine 1 generally comprises a frame 6 provided with a sawing unit 8 and a part-holding device composed of a slide 10. The sawing unit 8 comprises the saw mill 2 as well as support means 12, drive means 14 and propelling means 16 of this saw mill 2.

These means 12, 14 and 16 will not be described in greater detail herein since they are not specially related to the invention and are well known to the person skilled in the art.

In the example shown, the slide 10 which carries the parts to be cut 18 embedded in a resin is driven by an alternate translation movement parallel to the surface of the frame 6 and represented by the double arrow X, whereas the sawing unit 8 is driven by a stepwise forwards movement along a direction substantially perpendicular to the displacement of the slide 10 represented by the arrow Y and at a rhythm of one step after each travel of the slide 10. The saws of the saw mill 2 turn in the direction shown by the arrow Z.

Figure 2:
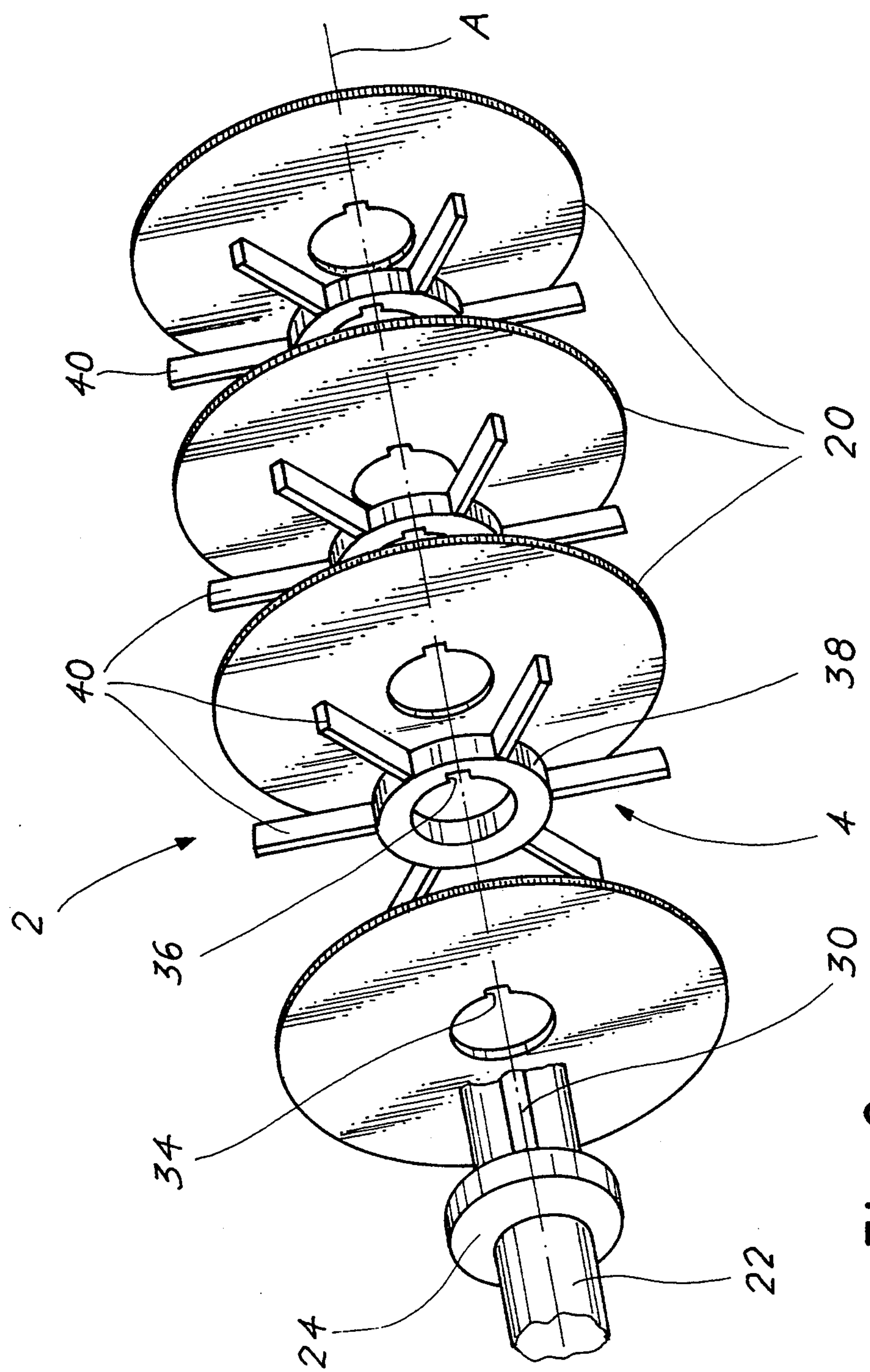
FIG. 2 is an exploded perspective view of a saw mill equipped with bracing devices according to a first embodiment of the invention.

Referring in particular to FIG. 2, this shows an exploded perspective representation of the saw mill 2 of the first embodiment of the invention.

This saw mill 2 comprises a plurality of circular saws 20 mounted on a drive shaft 22 rotating about a geometrical axis designated A in the drawing. According to the invention, these saws 20 are separated from one another by bracing devices 4, the dimension along the axis A of which defines the thickness of the parts to be cut.

Figure 8:
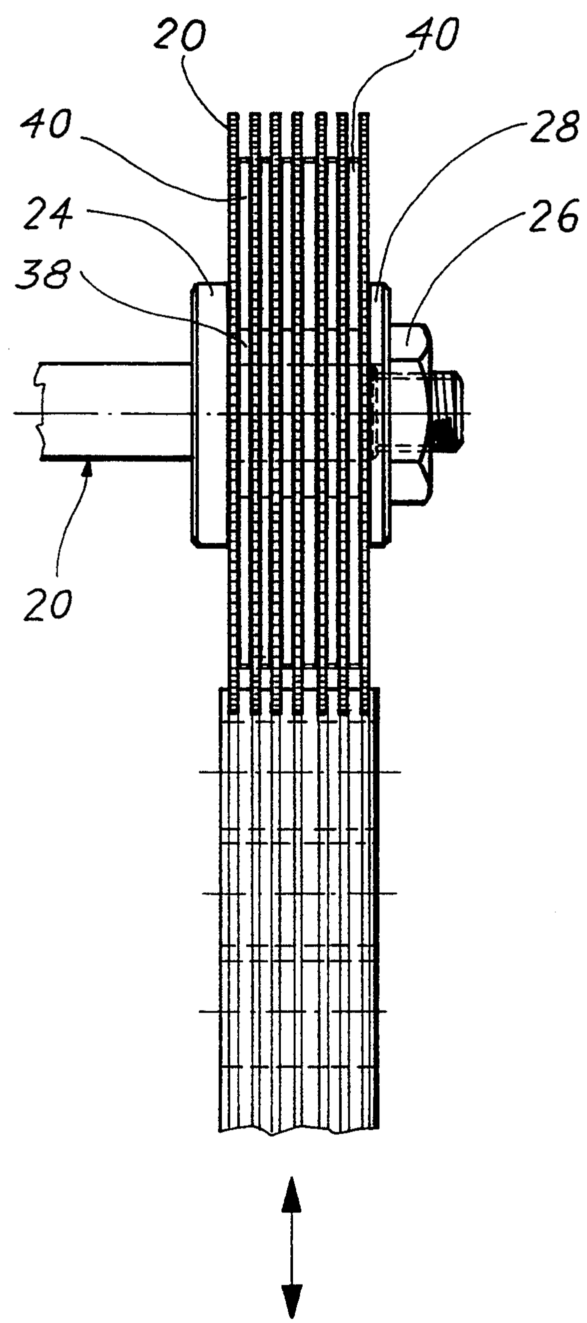
FIG. 8 shows a plan view of a saw mill according to FIG. 6.

The saws 20 and the bracing devices 4 are firmly held in conventional manner against a collar 24 provided on a shaft 22, for example by means of a nut 26 and a disc 28 screwed to the threaded part of the shaft 22 (FIG. 8).

The saws 20 and the bracing devices 4 are rendered solid with the shaft 22 in conventional manner by locking means, for example by means of a peg 30 which, on the one hand extends in a groove 32 (FIG. 5) provided along the entire length of the shaft 22 and which, on the other hand, cooperates with corresponding recesses 34, 36 provided respectively in the saws 20 and in the bracing devices 4.

It goes without saying that any other means of locking the saws 20 and of the bracing devices 4 on the shaft 22 may be devised. By way of example, the locking of the saws 20 and of the devices 4 on the shaft 22 may be effected by simple pressure of the saws 20 and of the devices 4 against each other applied by the tightening the nut 26.

Figure 3:
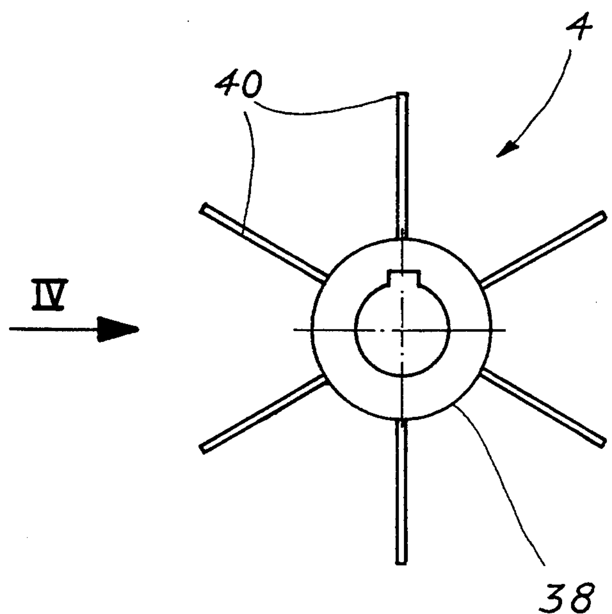
FIGS. 3 and 4 show respectively a front view and a side view of a first embodiment of a bracing device of the invention.
Figure 4:
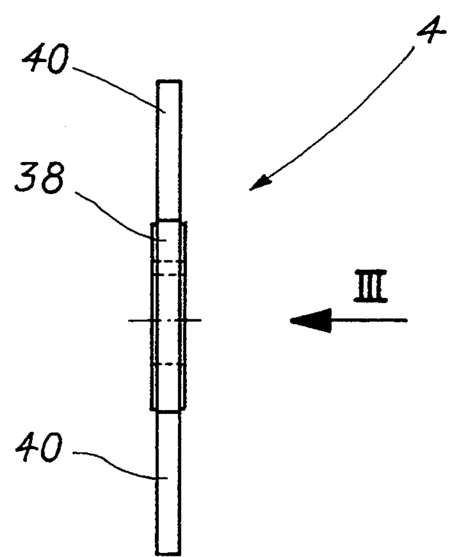

As may also be seen from FIGS. 3 and 4 and according to the first embodiment of the invention, the bracing devices 4 are each formed of a ring 38 with a plurality of tongues 40 extending radially therefrom.

According to an important feature of the invention, these tongues 40 have an inherent transverse resilience. In other words, these tongues 40 can easily flex in a plane perpendicular to the axis A under the action of a stress exerted on their extremity and resume their initial shape as soon as this stress is removed.

Advantageously, and as is shown in particular in FIG. 4, the axial dimension of the ring 38 is slightly greater than the axial dimension of the tongues 40, this difference being distributed in substantially even manner on both sides of the tongues 40. The axial dimension of the rings 38 is preferably a few hundredths of mm greater than the axial dimension of the tongues 40. This guarantees good freedom of bending of the tongues 40 when the bracing devices 4 are arranged and tightened between the saws 20. A difference of two hundredths of a mm is therefore perfectly suitable for this purpose.

According to another advantageous feature of the invention the tongues 40 present a rectangular cross section, the large side of this section extending along the axis A. This structure confers a certain rigidity to the tongues 40 in the plane parallel to the axis A while also conferring on them a flexibility in the desired direction of privileged deformation, that is in a plane perpendicular to the axis A. This ensures maximum efficacy of the device.

It is understood that according to the various embodiments of the invention the cross section of the tongues 40 can be differently shaped, for example circular or square.

It may also be seen from FIG. 3 that the tongues 40 are regularly distributed about the periphery of the ring 38 in such a way that good dynamic equilibrium of the bracing device 4 is obtained when this is mounted on the shaft 22.

The length of the tongues 40 varies as a function of the diameter of the saws with which the device 4 of the invention is used, but to obtain optimum efficacy the tongues must be sufficiently long to extend almost up to the cutting edge of the saws 20.

In the embodiment described, the tongues 40 are in one piece with the ring 38, this part preferably being made of a synthetic material having a low coefficient of friction.

By way of example injectable synthetic materials, such as polyethylene or fluorinated polymers such as polytetrafluoroethylene or materials having analogous mechanical properties are particularly suitable.

In a variant (not shown) it is possible to provide a ring 38 on the periphery of which tongues 40 are fitted. In this case the ring 38 can be made of metal and have T-shaped grooves into which tongues 40 of synthetic material such as one of those listed hereinabove, presenting a base in a shape corresponding to the grooves, are inserted. A notable advantage of a variant of this kind is that tongues 40 can easily be changed as soon as they show signs of wear.

Figure 5:
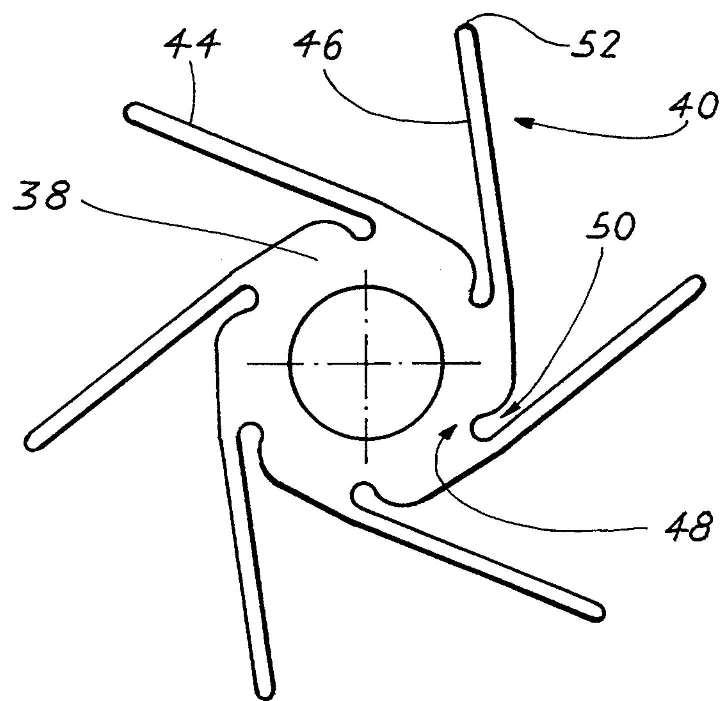
FIG. 5 shows a front view of a second embodiment of a bracing device of the invention.

Referring now to FIG. 5, this shows a second embodiment of the bracing device 4 of the invention in which the identical elements to those described above have the same reference numerals.

Unlike the first embodiment, the tongues 40 of the second embodiment extend tangentially from the periphery of the ring 38. Each tongue 40 has an anterior face 44 and a posterior face 46, the anterior face 44 of one tongue being connected to the posterior face 46 of the neighbouring tongue by means of a connecting zone 48. The connecting zone 48 is configured like an oblong groove 50 opening in the direction of the free extremity 52 of the tongues 40.

Figure 7:
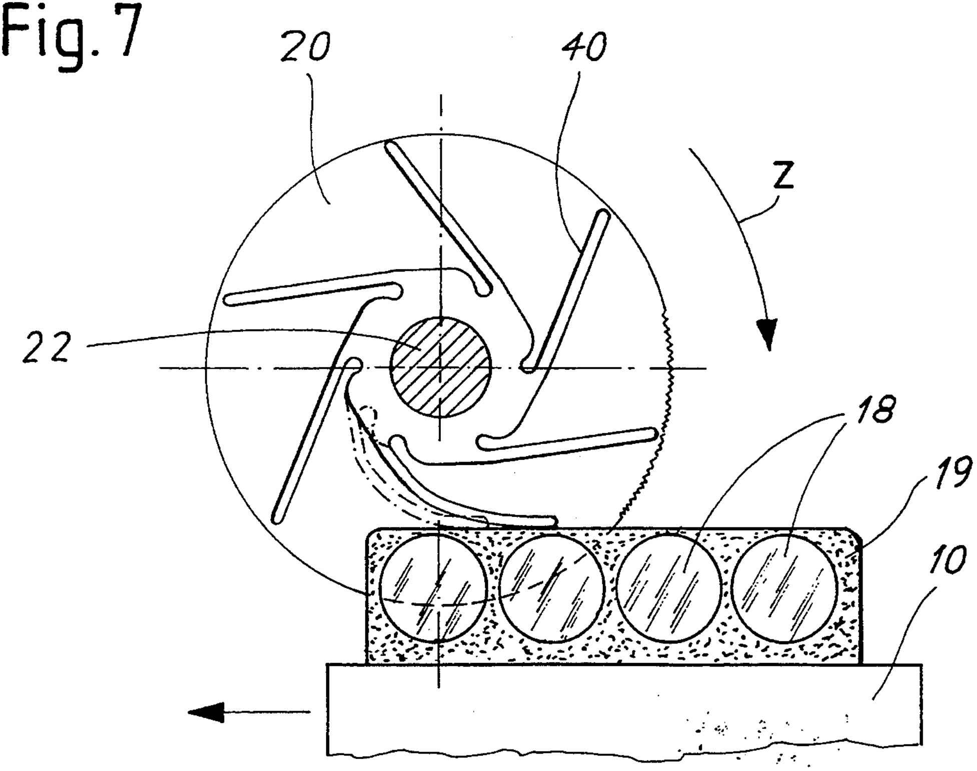
FIGS. 6 and 7 show respectively the characteristics of the first and second embodiments of a bracing device of the invention during the operation of sawing discs from sapphire cylinders.
Figure 6:
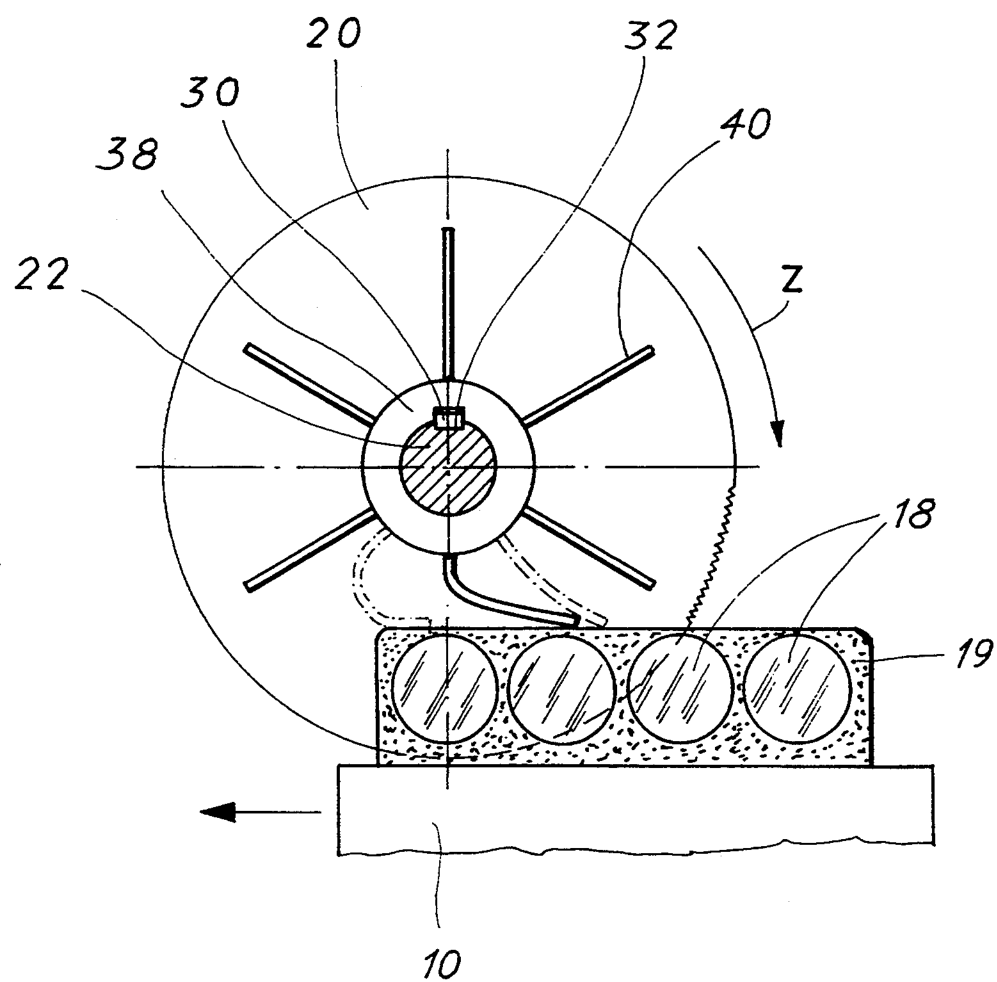

FIGS. 6 and 7 show in dotted lines the position of the tongues 40 at different stages in the rotation of the bracing device in relation to the parts to be cut. It will be noted that the tongues 40 distort progressively when they come into contact with the parts to be cut 18 and then resume their initial shape after they have ceased to be in contact with the parts to be cut 18 due to their inherent resilience.

In all the embodiments the tongues 40 which extend between the saws prevent the saws bending during sawing. The distance between the saws 20 is thus kept constant. The result is thus a considerable reduction in the discrepancy in the thicknesses of the parts cut.

It will be noted that the tangential structure of the tongues of the device 4 shown in FIG. 7 permits on the one hand displacement thereof when they come into contact with the parts to be cut and, on the other hand, permits a deeper cutting depth than with the radial tongues while reducing wear and the risk of breakage due to excessive bending of the tongues.

It goes without saying that the tongues of the device shown in FIGS. 5 and 7 are oriented so that they have a direction of mounting which depends on the direction of rotation of the saws.

I claim:

1. A bracing device, for the blades of a saw mill having at least two saws solid with a drive shaft having an axis, wherein said device comprises a one piece ring having a periphery from which extend a plurality of tongues having an inherent transverse resilience, said ring being configured to be disposed between said two saw blades, said inherent transverse resilience being such that said tongues easily flex in a plane perpendicular to said axis under action of an initial stress exerted on extremities of said tongues, and resume an initial shape as soon as said stress is removed, said device also comprising means for locking said ring to said shaft.

2. A saw mill comprising at least two saws disposed on a common drive shaft having an axis, said saws being rendered solid with said drive shaft by a locking device, wherein the saws are separated from one another by a bracing device, said bracing device comprising a ring having a periphery from which extend a plurality of tongues having an inherent transverse resilience, said ring being adapted to be disposed between said saws, and wherein said locking means comprises a peg which cooperates with said saws and said ring.

3. A bracing device, for the blades of a saw mill having at least two saws solid with a drive shaft having an axis, which comprises a ring having a periphery from which extend a plurality of tongues having an inherent transverse resilience, said ring being adapted to be disposed between said saw blades, wherein the tongues extend substantially tangentially from the periphery of the ring.

4. A bracing device according to claim 3 wherein each tongue has an anterior face and a posterior face, the anterior face of one tongue being connected to the posterior face of the neighbouring tongue by a connecting zone and in that the connecting zone has the configuration of an oblong groove opening in the direction of the free extremity of the tongues.

5. A bracing device according to claim 4 wherein the tongues are regularly distributed about the periphery of the ring.

6. A bracing device according to claim 5 wherein the axial dimension of the ring is equal to or greater than a lateral width of the tongues.

7. A bracing device according claim 6 wherein the tongues are of rectangular cross section.

8. A bracing device according to claim 7 wherein the tongues are made of a material which has a low coefficient of friction.

9. A bracing device according to claim 8 wherein the tongues are of the same material as the ring.

10. A bracing device according to claim 9 wherein the ring and the tongues are made of synthetic material.

11. A bracing device according to claim 10 wherein the material is a fluorinated polymer.

12. A saw mill comprising at least two saws disposed on a common drive shaft having an axis, said saws being rendered solid with said drive shaft by a locking device, wherein the saws are separated from one another by a bracing device, said bracing device comprising a one piece ring having a periphery from which extend a plurality of tongues having an inherent transverse resilience, said ring being disposed between said saws, said inherent transverse resilience being such that said tongues easily flex in a plane perpendicular to said axis under action of an initial stress exerted on extremities of said tongues, and resume an initial shape as soon as said stress is removed, said bracing device also comprising means for locking said ring to said shaft.

13. A saw mill according to claim 12, wherein the tongues extend radially from the periphery of the ring.

14. A saw mill according to claim 12, wherein the tongues extend substantially tangentially from the periphery of the ring.

15. A saw mill according to claim 13 or 14, wherein the saws extend radially beyond the tongues.

16. A saw mill according to claim 15 wherein the saws abut against lateral surfaces of the ring of the bracing device.

17. A saw mill according to claim 16 wherein the saws and the bracing device are rendered solid with the drive shaft by said locking device.

* * * * *